No. 894,606. PATENTED JULY 28, 1908.
V. CROUCH.
BALL BEARING WASHER.
APPLICATION FILED SEPT. 16, 1907.

Witnesses
Hugo P. Donch
J. W. Garner

Inventor
Victor Crouch
By Victor J. Evans
Attorney

UNITED STATES PATENT OFFICE.

VICTOR CROUCH, OF CALUMET, OKLAHOMA.

BALL-BEARING WASHER.

No. 894,606.    Specification of Letters Patent.    Patented July 28, 1908.

Application filed September 16, 1907. Serial No. 393,175.

*To all whom it may concern:*

Be it known that I, VICTOR CROUCH, a citizen of the United States of America, residing at Calumet, in the county of Canadian, Oklahoma, have invented new and useful Improvements in Ball-Bearing Washers, of which the following is a specification.

This invention is an improved ball bearing washer for use between movable machine elements to minimize friction between such machine elements, and the said invention consists in the construction, combination and arrangement of devices hereinafter described and claimed.

Figure 1:
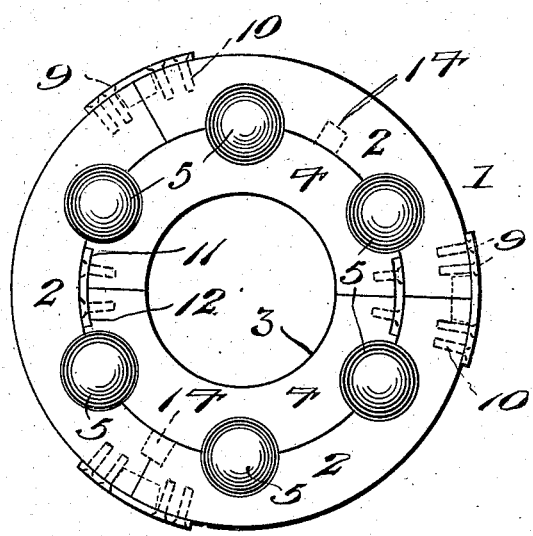
Figure 2:
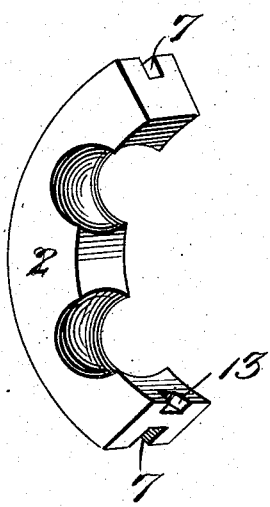
Figure 3:
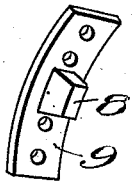
Figure 4:
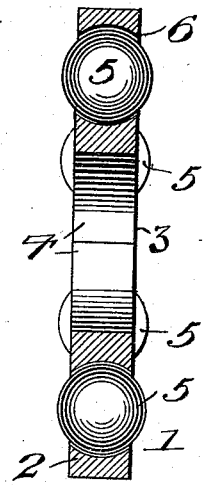

In the accompanying drawing,—Figure 1 is an elevation of a ball bearing washer constructed in accordance with this invention. Fig. 2 is a detail perspective view of one of the segments of the outer ring. Fig. 3 is a similar view of one of the plates for securing the outer ring segments together. Fig. 4 is a transverse sectional view of my improved ball bearing washer on a plane intersecting the bearing seats of two of the anti-friction balls.

My improved ball bearing washer consists of an outer ring 1 composed of separable segmental sections 2, an inner ring 3 composed of separable segmental sections 4 and anti-friction balls 5, which are mounted in correspondingly shaped seats 6 which are formed in the opposing faces of the said outer and inner rings. The inner ring 3 is concentrically disposed with reference to and is in contact with the inner side of the outer ring 1. The diameter of the said anti-friction balls exceeds the thickness of the washer, so that said balls project from opposite sides of the washer to bear on the opposing surfaces of the machine elements between which the washer is placed, so that the said bearing balls revolve, owing to the relative motion of the said machine elements and serve to minimize friction between such machine elements, as will be understood.

The separable segments, of which the inner and outer washer rings are formed, enable the balls to be placed in or removed from their bearing seats. The said segments are shown as provided in their outer sides at their ends with recesses 7 to receive wedge-shaped tongues 8 which project from the inner sides of segmental plates 9, which plates overlap the joints between the ends of the said segments 2 and are secured on the outer sides of the said segments by means of screws indicated in dotted lines at 10, or other suitable devices.

The sections or segments of the inner ring or member 3 are secured together by plates 11 and are gained or recessed in the outer sides of such sections 4, as at 12 and secured in place by screws. The outer sections 2 are provided on their inner sides with recesses 13 to receive studs 14 which project from the outer sides of the inner sections 4, to lock the said inner ring or member to the outer ring or member and prevent angular movement between them and consequent binding on the bearing balls 5.

Having thus described the invention, what is claimed as new, is:—

A ball bearing washer comprising an outer member composed of separable segmental sections having recesses in their inner sides, plates detachably connecting said sections together, an inner annular member composed of separable segmental sections and plates connecting said sections together, said sections of the inner member having studs which enter the recesses of the segments of the outer member and said plates of the inner member being gained in the sections thereof, said inner and outer members having bearing sockets or seats in their opposing sides and anti-friction devices mounted for rotation in such sockets or seats.

In testimony whereof I affix my signature in presence of two witnesses.

VICTOR CROUCH.

Witnesses:
　GEO. KENNEDY,
　VIOLA REYNOLDS.